United States Patent [19]

Sorensen

[11] Patent Number: 4,539,171

[45] Date of Patent: * Sep. 3, 1985

[54] DISPLACED SNORKEL SANDWICH MOLDING

[75] Inventor: Jens O. Sorensen, Rancho Santa Fe, Calif.

[73] Assignee: Primtec, Rancho Santa Fe, Calif.

[*] Notice: The portion of the term of this patent subsequent to Aug. 23, 2000 has been disclaimed.

[21] Appl. No.: 436,643

[22] Filed: Oct. 25, 1982

Related U.S. Application Data

[63] Continuation-in-part of Ser. No. 398,606, Jul. 15, 1982.

[51] Int. Cl.³ ............................................. B28B 1/24
[52] U.S. Cl. .................................. 264/328.8; 425/572
[58] Field of Search ...................... 264/328.8; 425/572

[56] References Cited

U.S. PATENT DOCUMENTS

| | | | |
|---|---|---|---|
| 2,698,460 | 1/1955 | Amo | 425/810 X |
| 2,992,455 | 7/1961 | Salzmon | 425/810 X |
| 3,647,338 | 3/1972 | Ise | 425/449 X |
| 3,659,997 | 5/1972 | Rees | 425/572 |
| 4,400,341 | 8/1983 | Sorensen | 264/328.8 |

FOREIGN PATENT DOCUMENTS

| | | | |
|---|---|---|---|
| 37-15474 | 9/1962 | Japan | 264/328.8 |
| 48-13711 | 4/1973 | Japan | 264/328.8 |

Primary Examiner—Donald Czaja
Assistant Examiner—V. Fischbach

[57] ABSTRACT

An improved method of transferring thermoplastic material from an injection unit to a sandwich mold when a transfer of molding material along the central axis of the clamping platens is not suitable. The method utilizes one or more snorkels which have a central axis which is displaced from the central axis of the clamping platens. The method may be adapted to various sandwich molding cycles, and does not have problems with material drooling into the parting surfaces. The method may easily be used, with minor adaptations, in standard horizontally operating injection molding machines.

15 Claims, 6 Drawing Figures

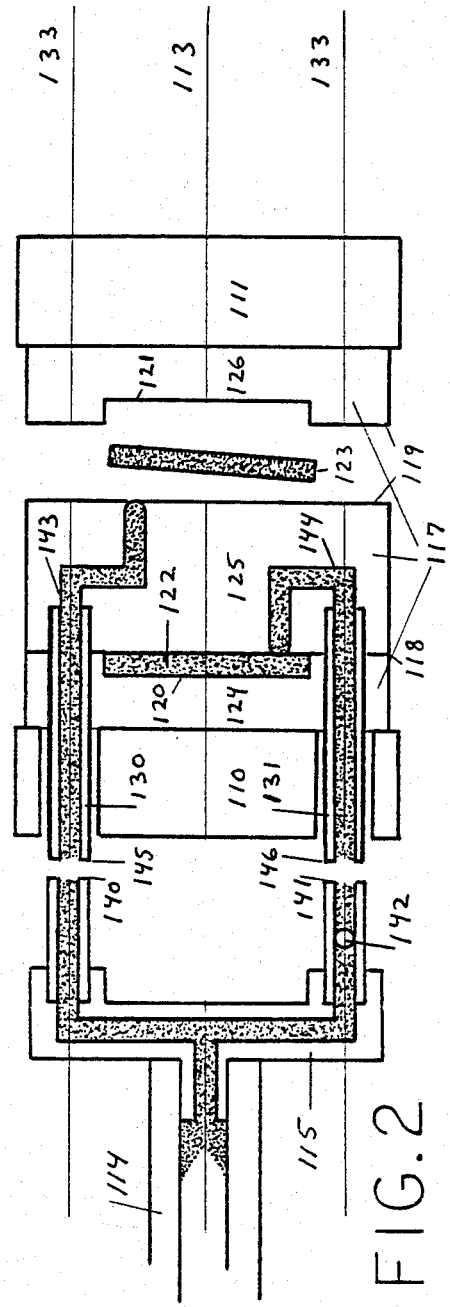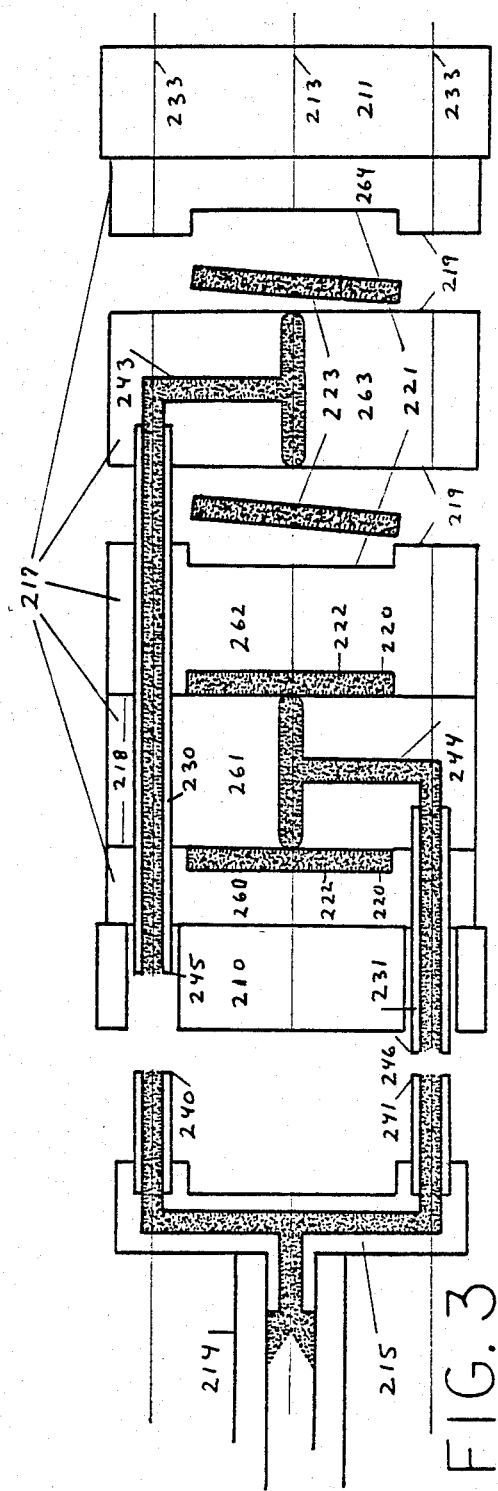

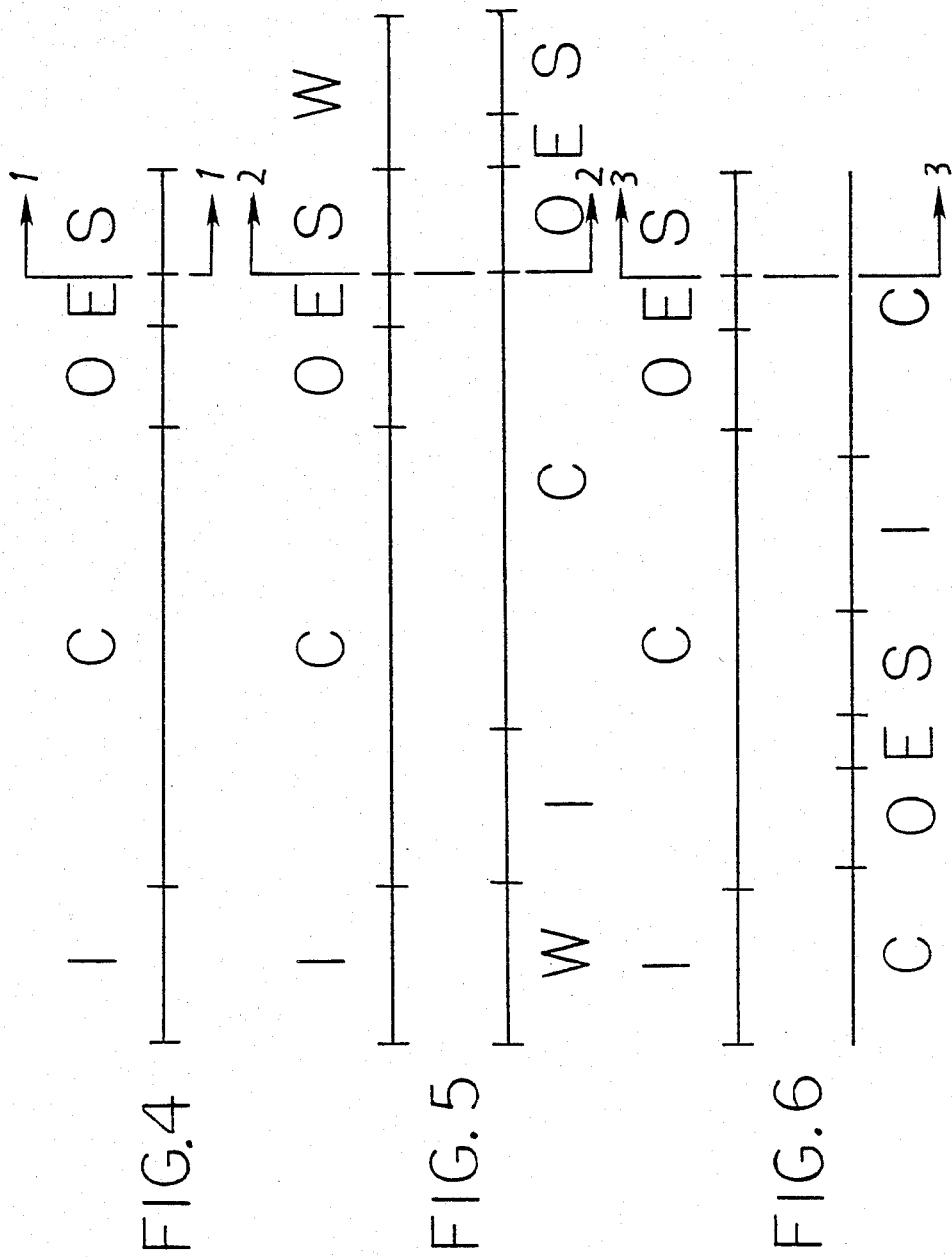

DISPLACED SNORKEL SANDWICH MOLDING

This is a continuation-in-part application of my prior application entitled DESYNCHRONOUSLY OPERATED SANDWICH MOLD, Ser. No. 398,606, filed July 15, 1982, pending by the same inventor.

FIELD OF THE INVENTION

The invention relates to injection molding of thermoplastic materials employing sandwich molds or stacked molds as they also are called, and specifically to an improved method of transferring the molten thermoplastic materials from the injection unit to the sandwich mold.

CROSS REFERENCE TO RELATED APPLICATIONS

This application is cross referenced to prior applications as follows: INJECTION MOLDING OF THERMOPLASTICS IN SANDWICH MOLD EMPLOYING DESYNCHRONIZED OPENING, EXTENDED AND CLOSING PERIODS, Ser. No. 275,408, now U.S. Pat. No. 4,400,341 filed June 19, 1981; DEPRESSURIZATION OF MOLTEN RUNNER SYSTEM, Ser. No. 398,602 filed July 15, 1982, and DESYNCHRONIZED INJECTION SANDWICH MOLDING, Ser. No. 398,603 deposited on July 15, 1982, all above referenced patent applications being by the same inventor.

DISCUSSION OF PRIOR ART

The traditional method of sandwich molding uses a sandwich mold with two parting surfaces and a snorkel which encompasses a part of the runner system and transfers the hot molten thermoplastic from the nozzle of the injection unit to the middle part of the sandwich mold, which is positioned between the two parting surfaces. The snorkel is positioned so that the central axis of the snorkel is identical to the central horizontal axis of the clamping platens of the injection molding machine. For different reasons it may, in certain instances, not be expedient to bring the material into the sandwich mold along the central axis of the clamping platens. An improved solution to this problem is the topic of my invention. Earlier solutions to the problem are described in U.S. Pat. No. 3,663,145 to Teraoka entitled: SYNTHETIC RESIN INJECTION MOLDING APPARATUS; U.S. Pat. No. 3,669,601 to Lainesse entitled: APPARATUS FOR INJECTION MOLDING; and U.S. Pat. Nos. 3,659,997; 3,723,040; and 3,973,892 to Rees entitled INJECTION MOLDING MACHINE WITH TRANSVERSE FEED. All the above mentioned prior art solutions basically deals with transporting the molten material to the top of the mold where it is injected into the mold. The problem with such solutions is that a certain amount of hot molten plastic is bound to drool out at the point where the material leaves the injection unit and enters the mold. Some of this material may drop down and get caught between the parting surfaces, causing production stops and/or damaged molds. Another problem with such solution is that it is very difficult to adapt a standard horizontally operating injection molding machine for injection into the top of a sandwich mold.

One example where it is expedient not to bring the material into the sandwich mold along the central axis of the clamping plates is when all the cooling cavities of the sandwich mold are placed substantially on the central axis of the clamping platens. Another example is when more than one runner system is needed, since both runner systems cannot both be placed on the central axis of the clamping platens. When a sandwich mold has more than two parting surfaces, more than one runner system is needed. In some instances it is expedient to desynchronize the injection to various cooling cavities in which case two or more runner systems may be used, in other instances different conditions such as the injection pressure curve or depressurization may need to be varied in the two or more runner systems.

SUMMARY OF THE INVENTION

A method of injection molding a thermoplastic material by employing an injection molding machine with a clamping unit comprising some clamping platens which have a horizontal central axis, the clamping unit is used for opening and shutting some parting surfaces of a sandwich mold in a direction along the central axis of the clamping platens.

The sandwich mold comprises at least two cooling cavities, each of which is encompassed by a parting surface, so that each parting surface encompasses at least one cooling cavity. The sandwich mold also comprises at least one fluid runner system, each runner system comprises a runner orifice, and feeds at least one cooling cavity; each runner system feeds at most such cooling cavities as are encompassed by two parting surfaces.

The injection unit comprises one distinct nozzle for communication with each runner orifice, so that each cooling cavity has associated therewith, a parting surface, a runner system, a runner orifice and a nozzle; the method relating to each specific cooling cavity comprises the steps of:

(a) shutting the associated parting surface by horizontal relative movement of the clamping platens, (b) sealing the associated nozzle with the associated runner orifice, (c) injecting some hot molten thermoplastic material from the associated nozzle, via the associated runner system to fill the specific cooling cavity, (d) cooling the injected plastic in the specific cooling cavity to thereby create a molded product, (e) opening the associated parting surface by horizontal relative movement of the clamping platens in order to eject the molded product.

The invention is characterized by the sandwich mold comprising a snorkel which encompasses at least a part of one of said runner system and its associated runner orifice, the snorkel projects with its associated orifice towards its associated nozzle and has a central axis, which is substantially parallel to, and displaced from, the central axis of the clamping platens.

The invention is further characterized by step (b) comprising the step of (f) sealing the nozzle, which is located outside the space which is encompassed by the extended planes of the parting surfaces with the runner orifices, by horizontal relative movement of the snorkel and the nozzle.

Since the nozzle is sealed with the runner orifices outside the space between the parting surfaces, any material which may have drooled out between the runner orifice and the nozzle may be kept away from the parting surfaces.

It is quite easy to adapt a standard horizontally operating injection molding machine to the method of the invention. A hole may be made in the stationary clamping platen for each snorkel of the invention, or the snorkel may be located outside the frame of the stationary clamping platen.

The nozzle of a standard horizontally operated injection molding machine is located on the central axis of the clamping platens, but in order to adapt to the invention, either a special nozzle displacer may be used, as is depicted in the drawings of the preferred embodiments, or the injection unit may be displaced for example in a vertical direction, which is a minor change to the machine.

Further objects and advantages of the invention will become apparent from a consideration of the drawings and subsequent description thereof.

BRIEF DESCRIPTION OF THE DRAWINGS

FIG. 2 refers to a second preferred embodiment of the invention and is a schematic diagram showing a partial top view of an injection molding machine and sandwich mold of the invention, the sandwich mold comprises two parting surfaces and two displaced snorkels.

FIG. 3 refers to a third preferred embodiment of the invention and is a schematic diagram showing a partial top view of an injection molding machine and a sandwich mold of the invention, the sandwich mold comprises four parting surfaces and two displaced snorkels.

FIG. 4 refers to the first preferred embodiment of the invention and shows a chronological sequence of the various operational steps of the method of the embodiment.

FIG. 5 refers to the second preferred embodiment of the invention and shows a chronological sequence of the various operational steps of the method of the embodiment.

FIG. 6 refers to the third preferred embodiment of the invention and shows a chronological sequence of the various operational steps of the method of the embodiment.

DESCRIPTION OF THE PREFERRED EMBODIMENTS

Figure 1:
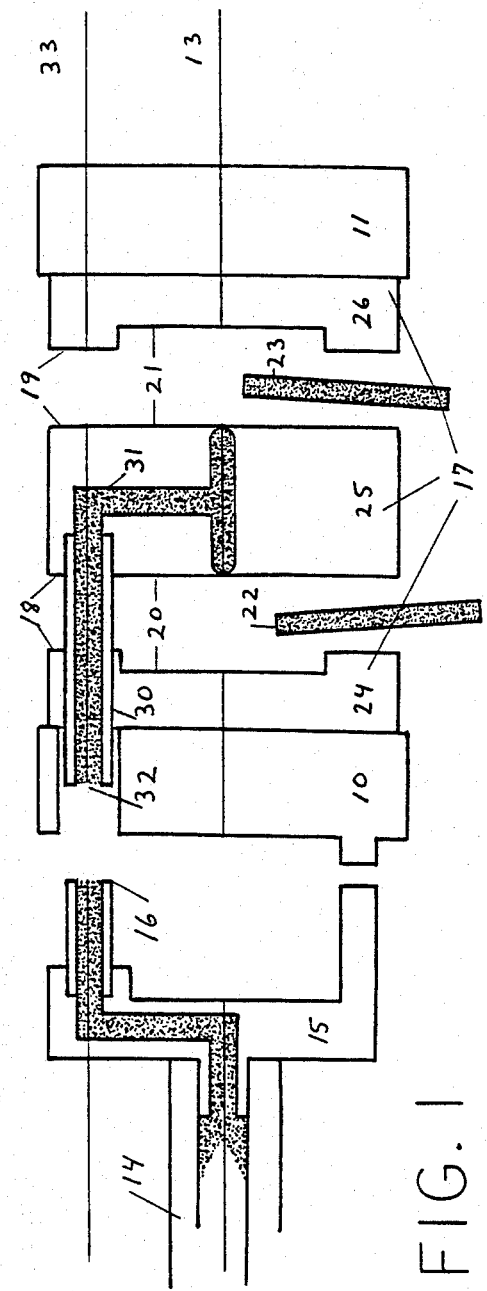
FIG. 1 refers to a first preferred embodiment of the invention and is a schematic diagram showing a partial side view of an injection molding machine and sandwich mold of the invention, the sandwich mold comprises only one displaced snorkel.

FIG. 1 relates to a first preferred embodiment of the invention and shows a partial view of a clamping unit comprising a stationary clamping platen 10 and a moveable clamping platen 11 with a central axis 13. Also shown is a partial view of an injection unit 14, comprising a nozzle displacer 15 and a nozzle 16. Held between the clamping platens 10, 11 is a sandwich mold 17 with a left mold part 24, a middle mold part 25 and a right mold part 26. Separating the left mold part 24 from the middle mold part 25 is a left parting surface 18; and separating the middle mold part 25 from the right mold part 26 is a right parting surface 19.

Encompassed by the left parting surface 18 is a left cooling cavity 20 and encompassed by the right parting surface 19 is a right cooling cavity 21. Also shown are two molded products 22, 23 being ejected from the mold 17.

Connected to the middle mold part 25 is a snorkel 30 which encompasses a part of a fluid runner system 31, the rest of the fluid runner system 31 is encompassed by the middle mold part 25. The snorkel 30 comprises a runner orifice 32, and the snorkel 30 projects from the middle mold part 25 with its orifice 32 towards the nozzle 16. The snorkel 30 has a central axis 33 which is parallel to, and positioned vertically above, the central axis 13 of the clamping platens 10, 11. The nozzle 16 is located outside the space which is encompassed by the extended planes of the parting surfaces 18, 19.

Both cooling cavities 20, 21 are placed on the central axis 13 of the clamping platens 10, 11. The snorkel 30 is significantly displaced from the central axis 13 of the clamping platens 10, 11, in order to laterally bypass the left cooling cavity 20.

FIG. 4 relates to the operation of the first preferred embodiment of the invention and shows the sequence of steps during a production cycle. Section line 1—1 illustrates the particular point in time of the cycle which is depicted in FIG. 1.

The symbols I, C, O, E and S stand for the periods of injection, cooling, opening, ejecting and shutting respectively. The line refers to the steps of both cooling cavities 20, 21 which operate synchronously as follows:

The moveable clamping platen 11 is moved towards the stationary clamping platen 10 along their central axis 13, whereby both parting surfaces 18, 19 are shut. The injection unit 14 is moved towards the stationary clamping unit 10 whereby the nozzle 16 seals with the runner orifice 32. Hot molten plastic is injected from the injection unit 14 via the nozzle displacer 15, the nozzle 16, the snorkel 30 and the runner system 31 to fill synchronously the cooling cavities 20, 21. The plastic is cooled in the cooling cavities and two molded products 22, 23 are created. Then the moveable clamping platen 11 is moved away from the stationary clamping platen 10 along the central axis 13 whereby both parting surfaces 18, 19 are opened and the molded products 22, 23 are ejected. A normal state of the art gear system, not shown, is used to synchronize the shutting and opening movement of the two parting surfaces 18, 19.

FIG. 2 relates to a second preferred embodiment of the invention and shows a partial view of a clamping unit comprising a stationary clamping platen 110 and a moveable clamping platen 111 with a central axis 113. Also shown is a partial view of an injection unit 114 comprising a first nozzle 140 and a second nozzle 141, the second nozzle 141 comprises a valve 142 which controls the flow of hot molten plastic from the injection unit 114. Held between the clamping platens 110, 111 is a sandwich mold 117 with a left mold part 124, a middle mold part 125 and a right mold part 126. Separating the left mold part 124 from the middle mold part 125 is a left parting surface 118, and separating the middle mold part 125 from the right mold part 126 is a right parting surface 119.

Encompassed by the left parting surface 118 is a left cooling cavity 120, and encompassed by the right parting surface 119 is a right cooling cavity 121. Also shown is a left molded product 122 enclosed in the left cooling cavity 120 and a right molded product 123 being injected from the right cooling cavity 121. Connected to the middle mold part is a first snorkel 130 which encompasses a part of a first fluid runner system 143, the rest of the first fluid runner system 143 is encompassed by the middle mold part 125. Also connected to the middle mold part is a second snorkel 131 which encompasses a part of a second fluid runner system 144, the rest of the second fluid runner system 144 is encompassed by the middle mold part 125. The first snorkel 130 comprises a first runner orifice 145, and the snorkel projects from the middle mold part 125 with its orifice 145 towards the first nozzle 140.

Likewise, the second snorkel 131 comprises a second runner orifice 146, and the snorkel 131 projects from the middle mold part 125 with its orifice 146 towards the second nozzle 141. Each snorkel 130, 131 has a central axis 133 which is parallel to, positioned displaced from, and with the same elevation as, the central axis 113 of the clamping platens 110, 111. Both nozzles 140, 141 are located outside the space which is encompassed by the extended planes of the parting surfaces 118, 119. Both cooling cavities 120, 121 are placed on the central axis 113 of the clamping platens 110, 111. Both snorkels 130, 131 are significantly displaced from the central axis 113 of the clamping platens 110, 111, in order to laterally bypass the left cooling cavity 121. Each runner system 143, 144 feeds only such cooling cavities 120, 121 as are encompassed by one parting surface 118, 119.

FIG. 5 relates to the operation of the second preferred embodiment of the invention and shows the sequence of steps during a production cycle. The upper line of events relates to the right cooling cavity 121 and the lower line of events relates to the left cooling cavity 120. Section line 2—2 illustrates the particular point in time of the cycle which is depicted in FIG. 2.

The symbols I, C, O, E, S and W stand for the periods of injection cooling, opening, ejecting, shutting and waiting respectively.

The moveable clamping platen 111 is moved towards the stationary clamping platen 110, along their central axis 113, whereby both parting surfaces 118, 119 are shut. The injection unit 114 is moved towards the stationary clamping platen 110 whereby the nozzles 140, 141 both seal with the runner orifices 145, 146 respectively. Hot molten plastic is injected from the injection unit 114. The valve 142 is shut. Therefore the material flows via the nozzle displacer 115, the first nozzle 140, the first snorkel 130 and the first runner system 143 to the right cooling cavity 121 filling the cavity. Meanwhile the left cooling cavity 122 is in a waiting position. Then the valve 142 is opened and hot molten plastic flows via the nozzle displacer 115, the second nozzle 141, the second snorkel 131 and the second runner system 144 to the left cooling cavity 120 filling the cavity.

Meanwhile the right cooling cavity 121 has started its cooling phase, and after the filling of the left cooling cavity 120, the cavity 120 also starts its cooling phase, and the two molded products 122, 123 are created. Then the moveable clamping platen 111 is moved away from the stationary clamping platen 110 along the central axis 113. The left parting surface 118 is kept shut by hydraulic means, not shown, whereby only the right parting surface 119 is opened and the right molded product 123 is ejected. Meanwhile the left cooling cavity 120 is finishing its cooling phase. The middle mold part 125 is moved in a right direction by the hydraulic means, not shown, so that the left parting surface 118 is opened and the right parting surface 119 is shut and the left molded product 122 is ejected. The moveable clamping platen 111 is moved towards the stationary clamping platen 110 whereby the left parting surface 118 also is shut, meanwhile the right cooling cavity 121 is in a waiting position. The shut period of the left parting surface 118 overlaps the shut period of the second parting surface 119, and the filling of both the cavities 120, 121 occurs during the overlapping period. The open period of the left parting surface 118 is desynchronized from the open period of the right parting surface 119.

FIG. 3 relates to a third preferred embodiment of the invention and shows a partial view of a clamping unit comprising a stationary clamping platen 210 and a moveable clamping platen 211 with a central axis 213. Also shown is a partial view of an injection unit 214 comprising a nozzle displacer 215 with a first nozzle 240 and a second nozzle 241. Held between the clamping platens 210, 211 is a sandwich mold 217 with four parting surfaces. The sandwich mold has a first mold part 260, a second mold part 261, a third mold part 262, a fourth mold part 263 and a fifth mold part 264. Separating the first mold part 260, the second mold part 261 and the third mold part 262 is a left pair of parting surfaces 218; and separating the third mold part 262, the fourth mold part 263 and the fifth mold part 264 is a right pair of parting surfaces 219.

Encompassed by the left pair of parting surfaces 218 is a left pair of cooling cavities 220, and encompassed by the right pair of parting surfaces 219 is a right pair of cooling cavities 221. Also shown is a left pair of molded products 222 enclosed in the left pair of cooling cavities 220 and a right pair of molded products 223 being ejected from the right pair of cooling cavities 221. Connected to the fourth mold part 263 is a first snorkel 230 which encompasses a part of a first fluid runner system 243, the rest of the first fluid runner system 243 is encompassed by the first mold part 263. Connected to the second mold part 261 is a second snorkel 231 which encompasses a part of a second fluid runner system 244, the rest of the second fluid runner system 244 is encompassed by the second mold part 261. The first snorkel 230 comprises a first runner orifice 245, and the snorkel projects from the fourth mold part 263 with its orifice 245 towards the first nozzle 240. Likewise the second snorkel 231 comprises a second runner orifice 246, and the snorkel 231 projects from the second mold part 261 with its orifice 246 towards the second nozzle 241. Each snorkel 230, 231 has a central axis 233 which is parallel to, positioned displaced from, and with the same elevation as, the central axis 213 of the clamping platens 210, 211. Both nozzles 240, 241 are located outside the space which is encompassed by the extended planes of the pairs of parting surfaces 218, 219. Both pairs of cooling cavities 220, 221 are placed on the central axis 213 of the clamping platens 210, 211. Both snorkels 230, 231 are significantly displaced from the central axis 213 of the clamping platens 210, 211, in order to laterally bypass the left pair of cooling cavities 221. The first snorkel 230 also has to bypass the left cooling cavity of the second pair of cooling cavities 221 in order to laterally bypass the cooling cavity. Each runner system 243, 244 feeds such cooling cavities as are encompassed by a pair of parting surfaces 218, 219.

FIG. 6 relates to the operation of the third preferred embodiment of the invention and shows the sequence of steps during a production cycle. The upper line of events relates to the right pair of cooling cavities 221 and the lower line of events relates to the left pair of cooling cavities 220. Section line 3—3 illustrates the particular point in time of the cycle which is depicted in FIG. 3. The symbols I, C, O, E and S stand for the periods of injection, cooling, opening, ejection, and shutting respectively.

The moveable clamping platen 211 is moved towards the stationary clamping platen 210, along their central axis 213, whereby both pairs of parting surfaces 218, 219 are shut. The injection unit 214 is moved towards the stationary clamping platen 210 whereby the nozzles 240, 241 both seal with the runner orifices 245, 246 respectively. Hot molten plastic is injected from the injection unit 214. The left pair of cooling cavities 220 already are filled earlier and therefore the material flows via the nozzle displacer 215, the first nozzle 240, the first snorkel 230 and the first runner system 243 to the right pair of cooling cavities 221. Meanwhile the left pair of cooling cavities 220 are in their cooling phase. The right pair of cooling cavities 221 starts their cooling phase, and the moveable clamping platen 211 is moved away from the stationary clamping platen 210 along their central axis 213. The right pair of parting surfaces 219 is kept shut by magnetic means, not shown, whereby only the left pair of parting surfaces 218 is opened and the left pair of molded products 222 is ejected. Meanwhile the right pair of cooling cavities 221 continue their cooling phase, thereby creating a pair of molded products 223. The moveable clamping platen 211 is moved towards the stationary clamping platen 210, along their central axis 213, whereby the left pair of parting surfaces 218 is shut. The injection unit 214 is moved towards the stationary clamping platen 210 whereby the nozzles 240, 241 both seal with the runner orifices 245, 246 respectively. Hot molten plastic is injected from the injection unit 214. The right pair of cooling cavities 221 have already been filled earlier in the cycle and therefore the material flows via the nozzle displacer 215, the second nozzle 241, the second snorkel 231 and the second runner system 244 to the left pair of cooling cavities 220. Meanwhile the right pair of cooling cavities 221 are in their cooling phase. The left pair of cooling cavities 220 starts their cooling phase, and the moveable clamping platen 211 is moved away from the stationary clamping platen 210 along their central axis 213. The left pair of parting surfaces 218 is kept shut by magnetic means, not shown, whereby only the right pair of parting surfaces 219 is opened and the right pair of molded products 223 is ejected. Meanwhile the left pair of cooling cavities 220 continue their cooling phase, thereby creating a pair of molded products 222.

The shut period of the left pair of parting surfaces 218 overlaps the shut period of the right pair of parting surfaces 219, and the filling of the two pairs of cooling cavities 220, 221 occur in alternate overlapping periods. A normal state of the art gear system, not shown, is used to synchronize the shutting and opening movement of the two parting surfaces in each pair of parting surfaces 218, 219. Therefore, the open period of the parting surfaces of each pair of parting surfaces 218, 219 are synchronous, and the open period of the parting surfaces of the different pairs of parting surfaces 218, 219 are desynchronous.

While the above description contains many specificities, these should not be construed as limitations on the scope of the invention but rather as an exemplification of three preferred embodiments thereof. Many other variations are possible, for example it is possible to operate each of the systems depicted in FIGS. 1, 2 and 3 with each of the cycles depicted in FIGS. 4, 5 and 6, with only minor modifications.

There may be various numbers of snorkels, parting surfaces and cooling cavities used in combination with various production cycles. Accordingly, the scope of the invention should be determined not by the embodiments illustrated, but by the appended claims and their legal equivalents.

I claim:

1. A method of injection molding a thermoplastic material by employing an injection molding machine with a clamping unit comprising some clamping platens which have a horizontal central axis, the clamping unit is used for opening and shutting some parting surfaces of a sandwich mold in a direction along the central axis of the clamping platens, located between two parting surfaces is a moveable middle mold part;

the sandwich mold comprises at least two cooling cavities each of which is encompassed by a different parting surface, so that each parting surface encompasses at least one cooling cavity;

the sandwich mold also comprises at least one fluid runner system, at least a part of which is located in said moveable middle mold part, each runner system comprises a runner orifice, and feeds at least one cooling cavity, each runner system feeds at most such cooling cavities as are encompassed by two parting surfaces;

the injection unit comprises one distinct nozzle for communication with each runner orifice, so that each cooling cavity has associated therewith a parting surface, a runner system, a runner orifice and a nozzle, the method relating to each specific cooling cavity comprising the steps of:

(a) shutting the associated parting surface by horizontal relative movement of the clamping plattens;
(b) sealing the associated nozzle with the associated runner orifice;
(c) injecting some hot molten thermoplastic material from the associated nozzle, via the associated runner system to fill the specific cooling cavity;
(d) cooling the injected plastic in the specific cooling cavity to thereby create a molded product;
(e) opening the associated parting surface by horizontal relative movement of the clamping platens in order to eject the molded product;

characterized by the sandwich mold comprising a snorkel which encompasses at least a part of one of said runner systems and its associated runner orifice, so that at least a part of the runner system is located in said moveable middlemold part, and so that the snorkel is attached to the moveable middle mold part, the snorkel projects with its associated orifice towards its associated nozzle and has a central axis, which is substantially parallel to, and displaced from, the central axis of the clamping plattens; and step (b) further comprising the step of:

(f) sealing the nozzle, which is located outside of the space which is encompassed between the extended geometric planes of the parting surfaces, with the runner orifices, by horizontal relative movement of the snorkel and the nozzle.

2. A method according to claim 1 where all cooling cavities of the sandwich mold are placed substantially on said central axis of the clamping platens, so that each parting surface only encompasses one cooling cavity;

characterized by said snorkel being significantly displaced from the central axis of the clamping platens, in order to laterally bypass at least one of the cooling cavities, which is/are placed substantially on said central axis of the clamping platens.

3. A method according to claim 1 where each runner system is feeding some cooling cavities which are encompassed by two distinct parting surfaces and characterized by the sandwich mold comprising only one snorkel and two parting surfaces.

4. A method according to claim 1 characterized by at least one snorkel being positioned with its central axis at a higher elevation than the central axis of the clamping platens.

5. A method according to claim 4 characterized by there being only one snorkel which is positioned with its central axis vertically above the central axis of the clamping platens.

6. A method according to claim 1 wherein the sandwich mold comprises a first parting surface and a second parting surface, and wherein the shut period of the first parting surface overlaps the shut period of the second parting surface, characterized by the step of:
(g) desynchronizing the filling of the cooling cavities encompassed by the first parting surface with the filling of the cooling cavities encompassed by the the second parting surface.

7. A method according to claim 1 where the sandwich mold comprises a number of fluid runner systems characterized by the sandwich mold comprising a number of snorkels each of which encompass at least a part of one of said runner systems and its associated runner orifice, each of said number of snorkels project with their associated orifices toward their associated nozzle and have central axes, which are substantially parallel to, and displaced from the central axis of the clamping platens.

8. A method according to claim 1 characterized by each runner system feeding at most such cooling cavities as are encompassed by one parting surface.

9. A method according to claim 1 characterized by each snorkel being positioned with its central axis at the same elevation as the central axis of the clamping platens.

10. A method according to claim 1 wherein the sandwich mold comprises a first parting surface and a second parting surface, and wherein the shut period of the first parting surface overlaps the shut period of the second parting surface, and wherein the filling of the cooling cavities encompassed by both parting surfaces occurs during said overlapping period; characterized by the step of:
(g) filling the cavities encompassed by the first parting surface prior to filling the cavities which are encompassed by the second parting surface.

11. A method according to claim 1 wherein the sandwich mold comprises a first parting surface and a second parting surface characterized by the step of:
(g) desynchronizing the open period of the first parting surface with the open period of the second parting surface.

12. A method according to claim 1 wherein the sandwich mold comprises a first parting surface and a second parting surface, and wherein the shut period of the first parting surface overlaps the shut period of the second parting surface, characterized by the step of:
(g) filling the cavities encompassed by the first parting surface and the second parting surface in alternate overlapping periods.

13. A method according to claim 1 wherein the sandwich mold comprises a first pair of parting surfaces and a second pair of parting surfaces, characterized by the steps of:
(g) synchronizing the open period of the parting surfaces of each pair
(g) desynchronizing the open period of the parting surfaces of the different pairs.

14. A method according to claim 12 wherein the sandwich mold comprises a first pair of parting surfaces and a second pair of parting surfaces, and wherein the shut period of the first pair of parting surfaces overlaps the shut period of the second pair of parting surfaces, characterized by the step of:
(g) filling the cavities encompassed by the first pair of parting surfaces and the second pair of parting surfaces in alternate overlapping periods.

15. A method according to claim 1 where each runner system is feeding cooling cavities which are encompassed by two distinct parting surfaces, and characterized by the sandwich mold comprising two snorkels and four parting surfaces.

* * * * *